United States Patent [19]
Naffa

[11] 4,401,286
[45] Aug. 30, 1983

[54] SHEAR OR COMPRESSION RELEASE LOCK

[75] Inventor: Faisal A. Naffa, Sterling Heights, Mich.

[73] Assignee: Brooks & Perkins, Inc., Livonia, Mich.

[21] Appl. No.: 894,135

[22] Filed: Apr. 6, 1978

[51] Int. Cl.³ .................. B64D 9/00; B60P 7/13
[52] U.S. Cl. .................. 244/137 R; 244/118.1; 410/78; 410/69
[58] Field of Search ............ 244/118 R, 137 R, 118.1; 188/1 C; 105/463, 464, 465, 366 R, 367; 410/32, 69, 70, 77, 78, 84, 87, 88, 90, 92

[56] References Cited
U.S. PATENT DOCUMENTS

| | | | |
|---|---|---|---|
| 874,150 | 12/1907 | Young | 188/1 C |
| 3,210,038 | 10/1965 | Bader et al. | 105/464 |
| 3,335,983 | 8/1967 | Mollon et al. | 244/137 R |
| 3,424,410 | 1/1969 | Galaup | 244/137 R |
| 3,724,788 | 4/1973 | Petry et al. | 244/137 R |
| 3,933,101 | 1/1976 | Blas | 244/118 R X |

Primary Examiner—Trygve M. Blix
Assistant Examiner—Rodney Corl
Attorney, Agent, or Firm—Barnes, Kisselle, Raisch, Choate, Whittemore & Hulbert

[57] ABSTRACT

A lock for a pallet to be discharged from aircraft in flight by deploying a parachute connected to the pallet behind the aircraft. The loaded pallet or container is locked in place by one or more abutments until the tension applied by the opened parachute reaches a predetermined value. Each abutment is maintained in locked position by pressure responsive lock mechanism. This lock mechanism may be in the form of a punch and penetrable fuse plate, or a compressible or deformable fuse adapted upon predetermined loading to yield a predetermined amount. The lock mechanism is carried by a rail extended longitudinally of the aircraft which is adapted to move between an upright operating position in which it overlies an edge of a pallet, and a lowered position in which it is beneath the pallet supporting surface.

35 Claims, 15 Drawing Figures

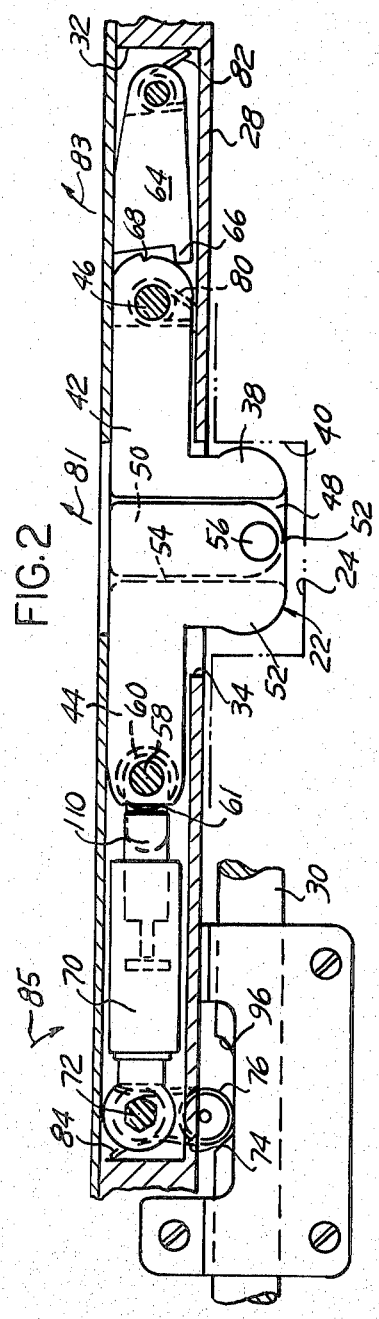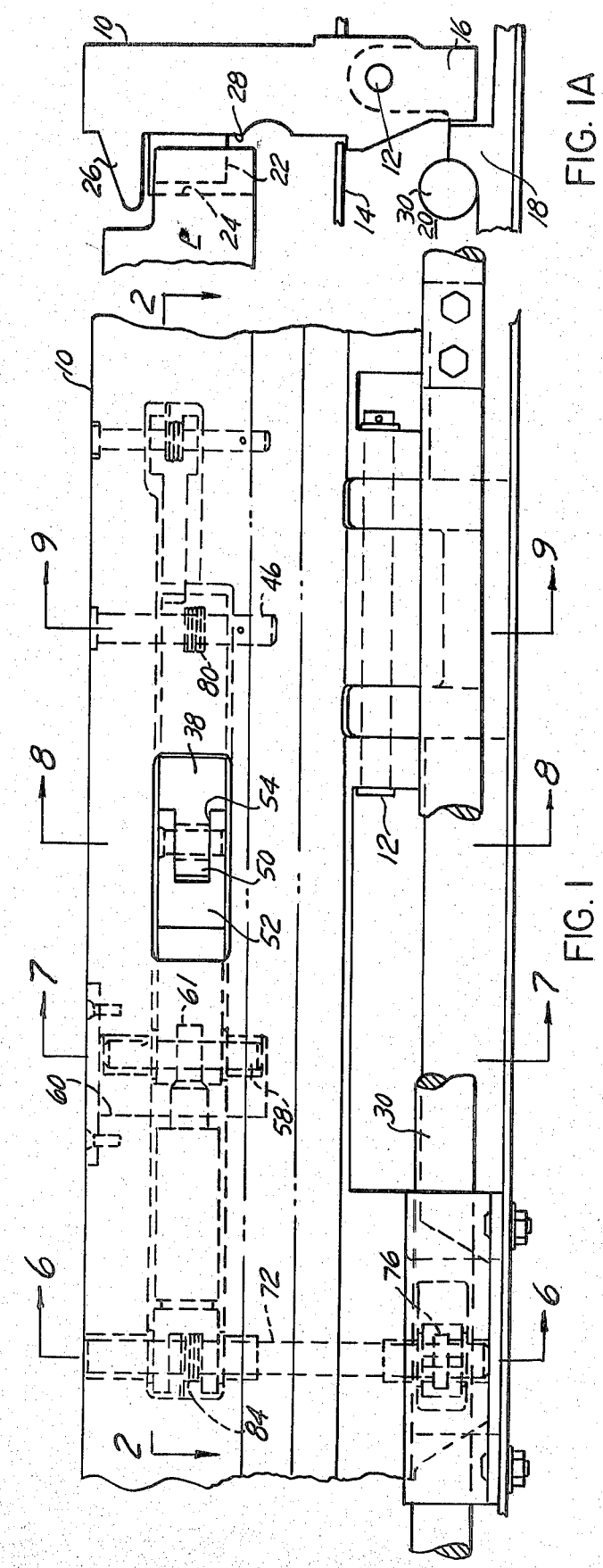
FIG. 1A
FIG. 2
FIG. 1

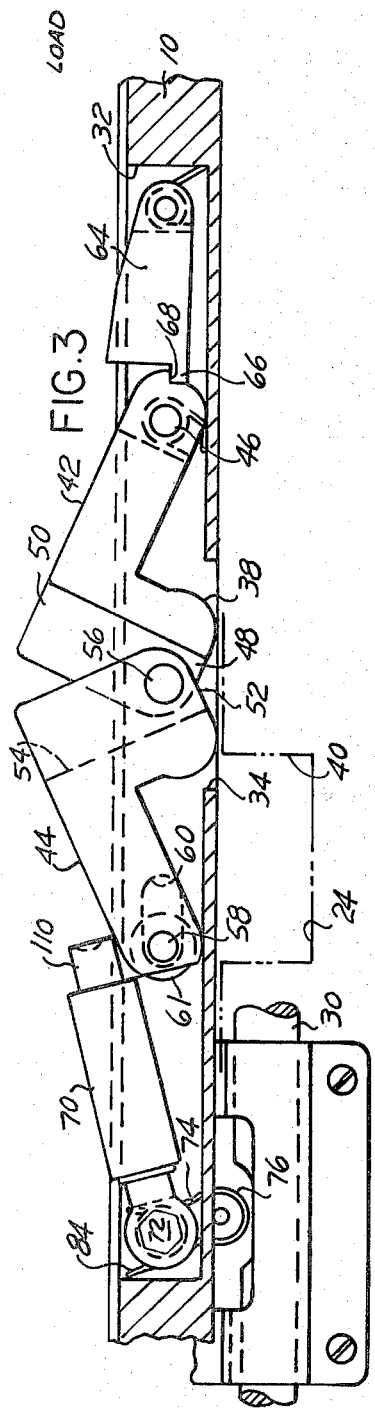
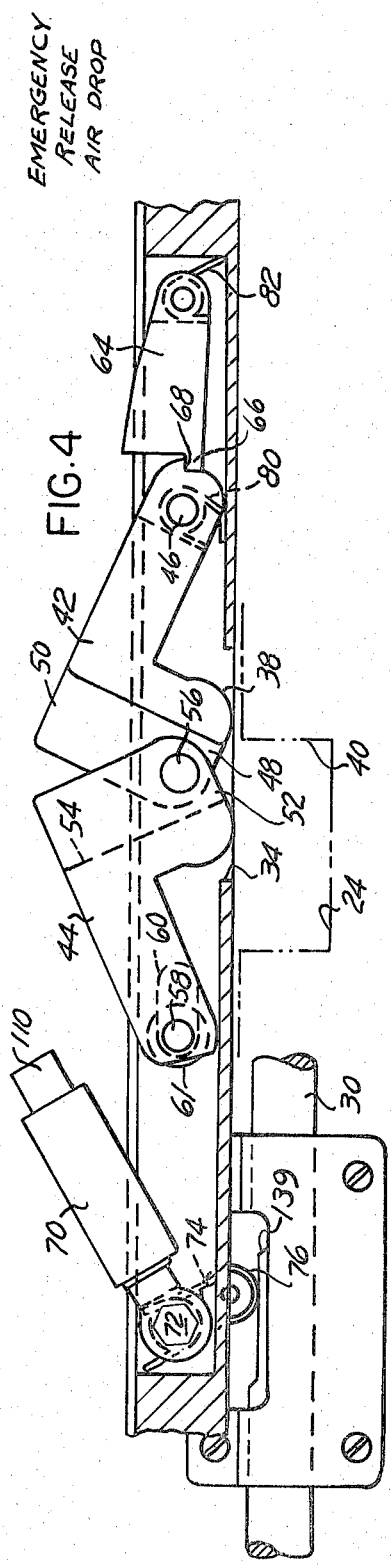
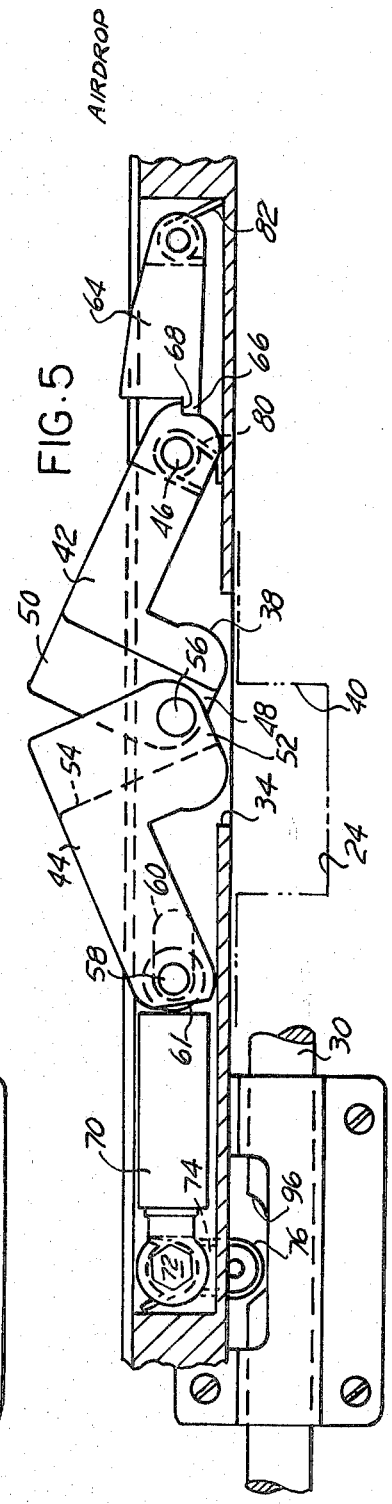

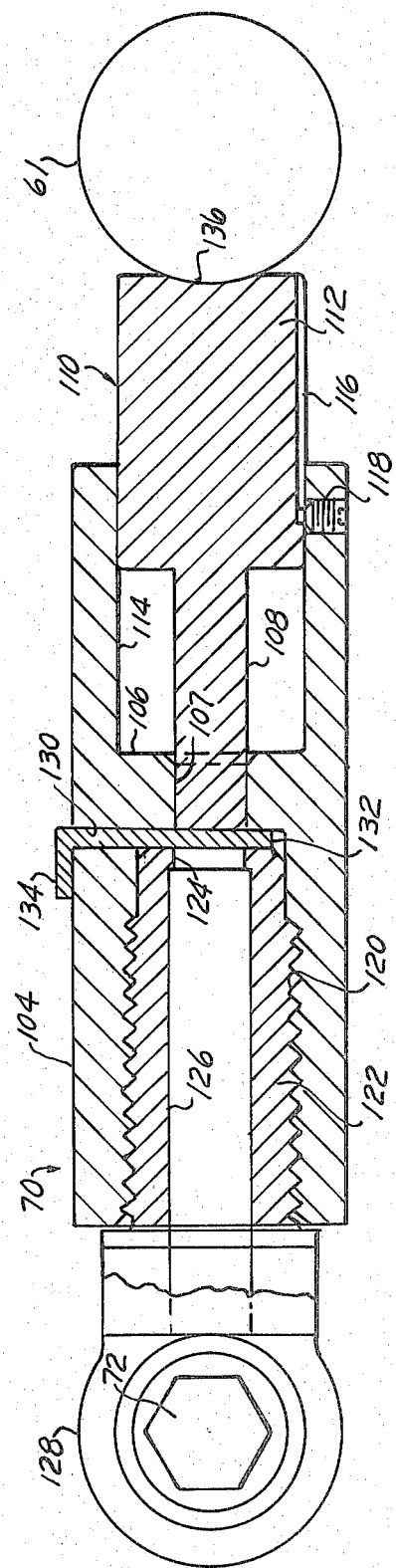
FIG. 11
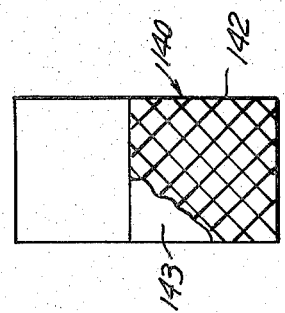
FIG. 13
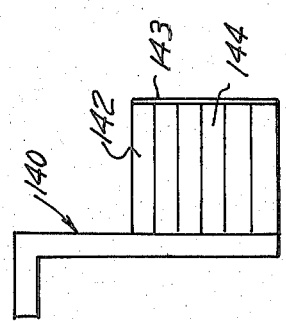
FIG. 12
FIG. 14

SHEAR OR COMPRESSION RELEASE LOCK

BRIEF SUMMARY OF THE INVENTION

Aerial delivery systems are known in which loaded pallets or containers are supported on a floor of the aircraft normally provided with anti-friction means such as rollers. The pallet or cargo container, which will hereafter be referred to simply as a pallet, has connected thereto one or more packed parachutes. When the cargo is to be delivered in flight, a rear door of the aircraft is opened and the parachute means is deployed and opened. The air resistance acting on the opened parachute applies a tension tending to pull the pallet rearwardly through the open door, after which it will be lowered to the ground under the restraint imposed by the parachute.

In general the pallet is retained in the aircraft by longitudinally extending guide rails having inwardly directed overhanging flanges. The flanged rails prevent lateral movement of the pallet as well as preventing upward displacement from the supporting surface as a result of aircraft movement.

In order to retain the loaded pallet in position until the parachute has opened and has established a predetermined minimum tension on the pallet, abutment means are applied comprising a movable abutment engageable with the pallet in position to prevent rearward movement thereof. The abutment is constructed and arranged so that pressure applied to the abutment by the pallet establishes forces tending to move the abutment to unlocked position, to permit the parachute to withdraw the loaded pallet from the aircraft.

A construction of this general type is disclosed in a prior patent to Mollon, et al, U.S. Pat. No. 3,335,983 which is assigned to the assignee of the invention disclosed herein.

In accordance with the present invention, lock retaining means is provided opposing movement of the abutment to unlocked position until pressure on the abutment reaches a predetermined value. In the preferred embodiment, the lock retaining means includes a cartridge comprising a punch and metal or plastic fuse plate arranged so that pressure applied to the punch is variable in accordance with a pressure applied to an abutment. When this pressure reaches a predetermined value, the punch abruptly penetrates the fuse plate and releases the abutment, which thereupon is moved by pressure of the pallet from its previously locked position to a position which permits withdrawal of the pallet. Alternatively, the fuse may be in the form of a compressible or penetrable material which yields to permit continued movement of a punch or similar pressure applying element when the load applied to the abutment reaches a predetermined value.

In accordance with the present invention, longitudinally extending pairs of rails are provided in the side of the aircraft which serve as guides and lateral retainers for the pallet. The locking means including the abutment and lock retainer is mounted within one of the rails, the abutment being movable from an unlocked position within the rail, through an opening in the inner wall of the rail, into locked position where it is engageable with the pallet. Conveniently, an abutment in locked position extends into a lateral recess provided at a side of the pallet.

When the locked mechanism is in its inoperative position within a rail, the rail may be pivoted downwardly about a longitudinally extending axis into a recess in the floor of the aircraft.

The tension responsive release device is in the form of an elongated cartridge in which the punch or driver is longitudinally slideable. Removable and replaceable fuse plates or compressible cells are provided which may be inserted through a slot in the side of a housing in position to be engaged by the operating end of the punch. The housing at its interior includes means for supporting the fuse plate in position to be penetrated by the punch and means for guiding the operating end of the punch as it penetrates the fuse plate.

Of course a single tension release device may be responsive to the total pull of the parachute means, and when activated, may operate a plurality of pallet locking devices.

BRIEF DESCRIPTION OF THE DRAWINGS

FIG. 1 is a fragmentary elevational view of a rail in elevated position and locking abutment means in locked position.

FIG. 1A is an end view of the rail structure shown in FIG. 1.

FIG. 2 is a fragmentary sectional view on the line 2—2, FIG. 1.

FIG. 3 is a view similar to FIG. 2 showing the pallet locking device in loading position.

FIG. 4 is a view similar to FIG. 2 showing the pallet locking device in emergency release airdrop position.

FIG. 5 is a view similar to FIG. 2 showing the locking device in normal airdrop unlocked position.

FIG. 11 is an enlarged longitudinal sectional view of the pressure release cartridge.

FIG. 12 is a side elevational view of a fuse plate of a collapsible honeycomb material.

FIG. 13 is an end view of the structure shown in FIG. 12.

FIG. 14 is a fragmentary end elevation of a pressure applying member for use with the device of FIG. 12.

DETAILED DESCRIPTION

Figure 6:
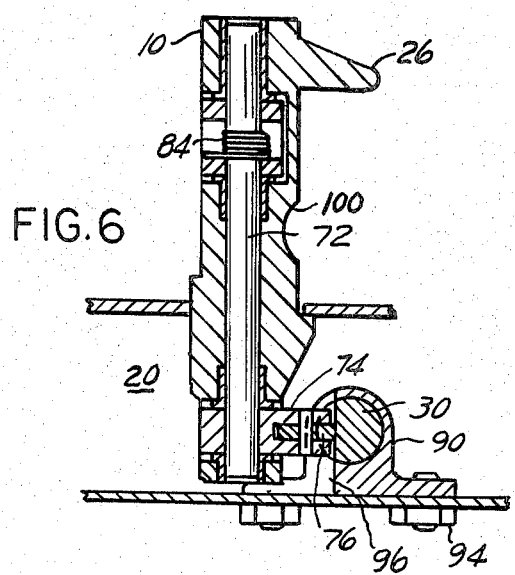
FIGS. 6 through 9 are sectional views on the line 6—6, 7—7, 8—8 and 9—9, FIG. 1.

Referring now to FIGS. 1, 1A and 2, there is shown a section of a rail 10 which has been swung about the axis of a pivot pin 12 to upright operating position in which the rail extends above deck 14 of the load carrying compartment of an aircraft in position to overlie the edge of a pallet P supported on rollers (not shown). The rail is located in its upright operating position by having its lower portion 16 engage a fixed abutment 18 on the bottom of an elongated chamber 20 which receives the rail in its inoperative position. Suitably carried by the rail as will subsequently be described in detail is a locking abutment 22 which is adapted to be received in a recess 24 formed in the edge of the pallet P. The rail 10 is provided with a flange 26 which overlies the edge of the pallet and prevents upward movement thereof. The inner surface 28 of the rail constitutes a guiding and lateral retaining surface which may be engaged by the pallet as it is rolled forwardly in the aircraft to the position in which it is to occupy in flight. The surface 28 also prevents lateral movement of the pallet P which might otherwise result from motion of the aircraft in flight.

Mounted for longitudinal movement in the chamber 20 which houses the rail 10 in its inoperative position, is an elongated control bar 30, the function of which will subsequently be described in detail. Pallet locking mechanism is for the most part housed within a compartment 32 located in the rail 10, as best seen in FIG. 2. This compartment includes the inner wall 28 of the rail which is provided with an opening 34 through which locking abutment means are movable. As illustrated in FIG. 2 an abutment means indicated generally at 22 is provided which is adapted to be projected into the illustrated position through the opening 34. The abutment means includes the movable abutment 38 engageable with the forward wall 40 of the recess 24 provided in the edge of the pallet.

The abutment means indicated generally at 22 in FIG. 2 is provided by a pair of L-shaped levers 42 and 44 as best illustrated in FIGS. 3 through 5. The lever 42 is pivoted on a pin 46 and includes a laterally extending arm 48 provided along its free edge with a relatively thin connector portion 50 and the full width rounded abutment 38. The lever 44 is provided with the laterally extending arm 52 which is bifurcated as indicated at 54 to receive the portion 50, the bifurcated portion 54 and the relatively thin portion 50 being pivotally interconnected by pivot pin 56. Lever 44 is provided with a guide pin 58 slidably movable in elongated longitudinally extending slots or recesses 60. Pin 58 carries a roller 61 for a purpose which will later be described. Lever 42 is mounted on a fixed pivot pin 46 so that as the locking device is moved from the locking position shown in FIG. 2 to the unlocked position indicated in FIGS. 3-5, in which position pivot pins 46, 56 and 58 come into alignment, the pin 58 is shifted to the left in the guide slot 60.

Also pivoted within the compartment 32 is a latch lever 64 having a dog 66 received in a notch 68 in lever 42. In the position illustrated in FIGS. 3-5 the latch lever prevents movement of the locking levers 42, 44 into the locking position illustrated in FIG. 2.

Also pivotally mounted within the compartment 32 is a pressure responsive cartridge 70 which will subsequently be described in detail. For the present it is sufficient to note that when locking levers 42, 44 are in the locked position illustrated in FIG. 2, the cartridge 70 may be pivoted into the illustrated position about the axis of a shaft 72 which extends downwardly to the lower edge of the rail and is there provided with an actuating arm 74 carrying a roller 76 for a purpose which will presently be described.

Referring now to FIG. 2, a spring 80 is provided urging the locking levers 42, 44 upwardly as seen in this Figure to an unlocked position as indicated by arrow 81. A spring 82 is provided urging the latch lever 64 upwardly in this Figure as indicated by arrow 83. A spring 84 is connected to the cartridge 70 or shaft 72 urging it clockwise as indicated by arrow 85 as seen in FIG. 2 into its operating position.

From the foregoing description it will be apparent that forces applied by a deployed parachute to the pallet are transmitted to the abutment 38 as illustrated in FIG. 2 and will tend to rock lever 42 clockwise about the pivot pin 46. This motion when permitted is transmitted to the lever 44 through the connecting pin 56 and will move the pin 58 to the left in FIG. 2. The roller 61 is engageable by the lock retainer cartridge 70 and will be described later.

Reference is now made to FIGS. 6 through 10 which illustrate details of the rail 10 and the lock mechanism including levers 42 and 44.

As best seen in FIG. 6, rail 10 is in an elevated position and this figure illustrates the shaft 72 which is adapted to control the position of the cartridge 70 as previously described. The lever arm 74 at the bottom of the shaft 72 carries the roller 76 which is engageable with the longitudinally movable control rod 30 which is retained in guided relationship in brackets 90 bolted or otherwise secured to the bottom wall of the chamber 20 as indicated at 4. Comparing FIG. 6 with FIG. 2 it will be observed that the cartridge 70 is in an operating position in which it prevents retraction of locking levers 42, 44 and that in this condition the roller 76 is received within a notch 96 in the control rod 30. It will be apparent that movement of the control rod 30 to the right as seen in FIG. 2 will swing cartridge 70 counterclockwise out of its lock retaining position as seen in FIG. 4.

Figure 7:
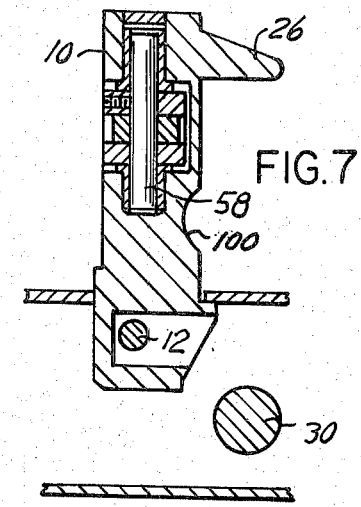

Referring now to FIG. 7 which is a sectional view through the rail structure at the position occupied by the pin 58 carrying roller 61. At this point it will be observed that the control rod 30 is of a full circular cross-section.

Figure 8:
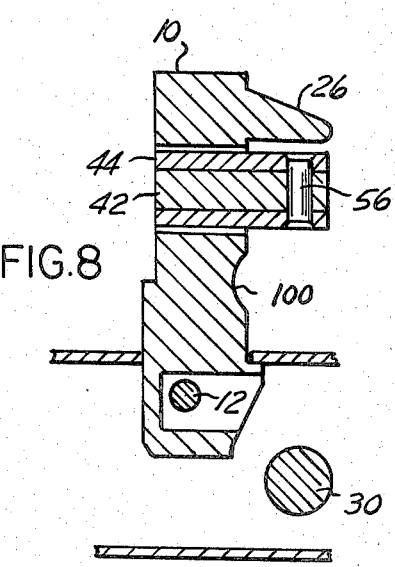

Referring now to FIG. 8 it will be observed that this section view is taken through the portion of the lock containing the pivot pin 56 which interconnects the interleaved portions of the levers 44, 42.

Figure 9:
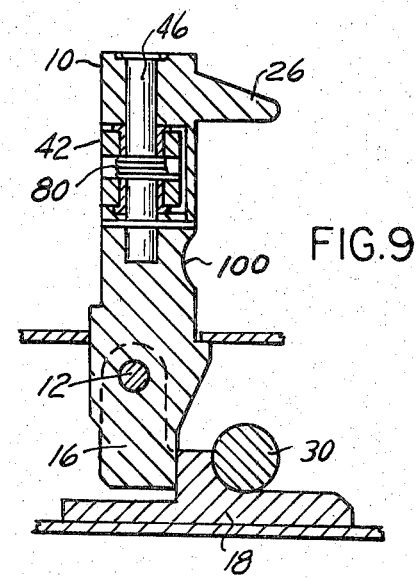

Referring now to FIG. 9 it will be observed that this section view is taken through the pivot pin 46 which provides a fixed pivot mounting for the lever 42. In this figure as in FIG. 1A it will be observed that the rail has its lower portion 16 in solid abutment with the stop 18 which prevents the rail from being swung counterclockwise as a result of upward forces applied to its retaining flange 26.

Figure 10:
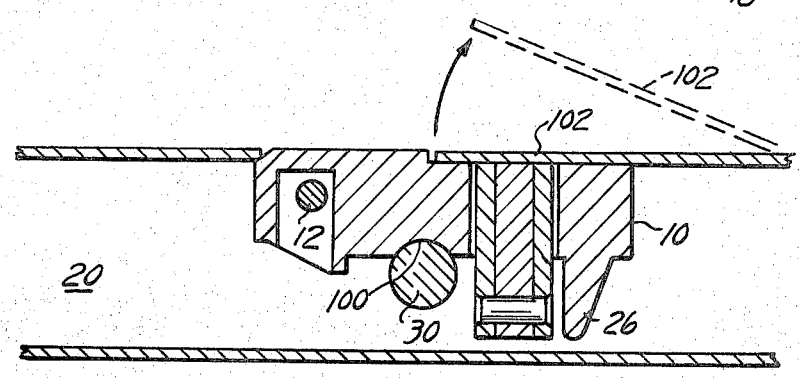
FIG. 10 is a view similar to FIG. 8 with the rail swung to inoperative position.

Referring now to FIG. 10 it will be observed that the rail 10 has been pivoted clockwise from the position illustrated in FIG. 8 about the pivot pin 12 so that it and the locking mechanism is completely received within the chamber 20. The rail 10 is provided with a shallow recess 100 which engages the control rod 30. A pivoted cover plate 102 is provided which may be moved to the closed position indicated in full lines and retained in such position by a suitable fastening means such as a quick-turn screw or the like.

Referring now to FIG. 11 the pressure responsive cartridge 70 is illustrated in detail. As seen in this figure the cartridge comprises an elongated generally tubular housing 104 provided intermediate its ends with a transversely extending web or wall 106 having an aperture 107 to receive the inner punch portion 108 of a punch 110. The punch includes the larger portion 112 which is slidably received in the bore 114 of the housing 104. Portion 112 is grooved as indicated in 116 and receives the inner end of a stop screw 118 which prevents the punch from separating from the housing 104.

At its opposite end the housing 104 is provided with an internal thread as indicated at 120 and this portion receives an externally threaded tubular anvil member 122, the inner end of which is provided with a reduced opening 124, dimensioned to receive the inner end of the punch 108. Outwardly from the reduced opening 124, anvil 122 is provided with an enlarged through opening 126 which freely receives a plug cut from a fuse plate for ready disposal. At its outer end the anvil 122 is provided with ears 128 apertured to receive the noncircular upper end of the shaft 72.

Extending laterally into the interior of the housing 104 is a slot 130 dimensioned to receive a flat fuse plate or disc portion 132 having a laterally extending ear 134 to facilitate removal of the punched fuse plate after operation of the lock release mechanism.

The flat plate portion 132 of the fuse is inserted into the opening to the position illustrated after which the anvil 122 is tightened down to mount the fuse plate 132 against the side of the anvil in position to have a slug punched out of it by inward movement of the punch portion 108.

The outer end of the enlarged portion 112 of the punch is provided with a cylindrically formed recess 136 to be engaged by the roller 61 mounted on the pin 58.

When sufficient force is applied to the punch portion 104 as a result of pressure applied to the abutment 38 by the locked pallet P, the punch abruptly penetrates the plate 132 permitting substantially free movement of the roller 61 to the left as the pivot pin 56 assumes a position in line with the pins 46 and 58, thus permitting the abutment 38 to be freely retracted through the opening 34 and thereby freeing the pallet for unloading movement by the parachute.

While the punch 110 is movable relatively freely after the fuse plate has been punched, nevertheless it will be apparent that substantial force may be required to move it again to the initial position illustrated in FIG. 11, in order to withdraw the punch portion 108 from the hole punched into the fuse plate. When the punch has been withdrawn from the hole punched into the fuse plate, the used fuse plate may be withdrawn by the ear 134 and discarded. A new fuse plate may be inserted into the slot 130 and the threaded anvil 122 tightened to place the parts in the condition illustrated in FIG. 11.

It has been found that the pressure responsive punch provides for release of the lock under accurately predetermined tension applied by the connection between the parachute and the loaded pallet. It will, of course, be understood that variable factors may be controlled to provide this release at predetermined different tensions. Conveniently the fuse plate may be formed of metal, either a soft metal such as copper or aluminum, or a harder iron or steel alloy. Also the fuse plates may conveniently be formed of suitable relatively hard plastic materials or otherwise suitably formed metals such as, for example, laminated or honeycombed construction of suitable material such as metals, plastics, fibrous metals, etc. It will, of course, also be apparent that the force required to cause the punching actuation may be varied by varying the thickness of the fuse plate and/or the diameter of the punch. When a particular size and material of punch is selected it is found that tension release occurs with highly satisfactory uniformity.

In the preferred embodiment of the invention, actuation of the tension release mechanism is accompanied by complete penetration of the fuse plate, so that a slug is punched out of it. However, the operation may involve, instead of complete penetration through the fuse plate, a predetermined penetration or distortion thereof by the punch or pressure applying member. In this case the fuse plate may be a laminated or honeycomb construction, in which a predetermined force applied by the punch or pressure-applying member causes compression or displacement of the material together with a corresponding movement of the punch or pressure applying member sufficient to actuate the release mechanism.

While the operation of the tension load release mechanism is believed apparent from the foregoing, certain various operating conditions will be described.

It will be noted in FIG. 2 that the draw bar 30 is in neutral position and that the spring 84 has moved cartridge 70 into position within the compartment 32 such that the punch 110 is engaged by the roller 61 thus preventing movement of the abutment 38 out of the locked position. It will also be apparent that at this time the roller 61 is engaged in the recess 136 thus retaining the cartridge 70 in the illustrated position. The spring 80, biasing the lever 42 clockwise as seen in this figure applies a bias to this roller 61 sufficient to retain the parts in the illustrated position, even in the absence of any force applied by the pallet to the abutment 38.

It will be noted at this time that the latch lever 64 has been moved inwardly so that its detent 66 is out of engagement with the notch 68 thus permitting movement of levers 42, 44 from the position illustrated for example in FIG. 3 to the position of FIG. 2. It will be understood that with lever 64 in the position illustrated in FIG. 3, it prevents movement of levers 42, 44 to the blocking position of FIG. 2.

With the part in position as illustrated in FIG. 2, when no pallet is in position, to load a pallet, the draw bar 30 is moved to the right to the position illustrated in FIG. 3 to release cartridge 70 for movement by spring 84 into alignment with the pivot pins 46, 58. It will be noted at this time that the latch 64 is in the position in which its detent 66 is engaged in the notch 68 thus preventing manual displacement of the locked lever 42, 44 to the locked or pallet-blocking position. At this time the pallet is moved into position so that its locking recess 24 is adjacent the opening 34 in the rail 10. The portion of the latch lever 64 which projects outwardly from the rail 10 is kicked inwardly to the position illustrated in FIG. 2, releasing lever 42, 44, at which time the outwardly projecting portions of these levers may be pressed inwardly to the position shown in FIG. 2. This moves the abutment means 22, including the abutment 38 into the recess into the pallet. At the same time this results in the movement of the pin 58 and roller 71 to the right as seen in FIG. 2, permitting the cartridge 70 to move into the operating position illustrated in this figure.

Referring now to FIG. 4, the parts are illustrated in the position occupied when in emergency release or airdrop position. This condition is brought about by movement of the control rod 30 forwardly or to the right as seen in FIG. 4 so that roller 76 is operated by cam surface at 139 to swing the cartridge 70 out of operating position. When this is done, spring 80 swings lever 42 and cooperating lever 44 outwardly to the retracted or unlocked position, thus releasing the pallet for emergency airdrop. It will be observed that when the levers 42, 44 are swung outwardly that the spring 82 will swing latch lever 64 to the position illustrated in FIG. 4 thus positively retaining levers 42, 44 in unlocked position.

Referring now to FIG. 5, the parts are illustrated in the position which they occupy as the pallet is moved toward release position by the parachute. At this time the control rod 30 is in the position in which the notch 96 has permitted the cartridge 70 to move into its operating position. In this figure it is assumed that sufficient force has been applied to the abutment 38 by the abutment surface 40 to cause sufficient force to be applied to the punch 110 to cause the punch to penetrate the fuse plate 132. As soon as the punching operation occurs, the punch 110 is relatively freely movable inwardly of the cartridge housing so that pin 58 and roller 61 move to the left as seen in FIG. 5 as the abutment 38 is withdrawn from the pallet recess 24. Again at this time latch lever 64 moves to the latching position illustrated in FIG. 5 and must be moved inwardly by the operator before again engaging the locking mechanism with another plate.

In the foregoing a single pressure releasable pallet locking device has been described in considerable detail. The device as so far described has as an operating characteristic the ability to oppose a very substantial predetermined resistance without appreciably yielding and then to yield abruptly to effect substantially instantaneous release of the loaded pallet for aerial delivery.

It is usually desirable to provide two or more and in some cases a substantial number of pressure release devices so that each can provide a predetermined fraction of the pressure required to release the pallet. Where a device as described in the foregoing is employed in multiple installations it is, of course, necessary that the devices be capable of absorbing its own fraction of the entire load. Of course, when the total load reaches the predetermined amount, one particular locking device will yield and the entire load is absorbed by the remaining devices with the result that the release of all devices is substantially simultaneous.

The invention is also capable of being carried out by using the pressure release device to trigger release of a plurality of load locking devices. Thus for example in prior U.S. Pat. No. 3,335,983 also assigned to assignee herein, there is illustrated a manual system for simultaneously releasing a plurality of pallet locking devices.

The pressure responsive devices may be connected to operate control rod or rods, similar to rods 30 disclosed herein, so that upon puncture of the fuse plate 132, the rod will be shifted to effect simultaneous release of all locking devices to release the pallet or other load for withdrawal by the parachute means.

Where the term "fuse plate" is used herein, unless otherwise specified, it is to be understood to include a solid plate from which a slug may be punched, or a plate of compressible penetrable, or collapsible material. Alternatively, the fuse may be in the form of a collapsible honeycomb. Such a fuse plate is shown in FIGS. 12 and 13 at 140, where the portion of the fuse plate 142 to which pressure is applied by an element similar to punch 108 of FIG. 11, is shown as of honeycomb form, with cells 144 extending parallel to the direction of pressure application. Each individual cell is of course equivalent to a tube, and the tubes of the honeycomb give mutual support to each other. The punch may have the form shown in FIG. 14, having a flat nose 146 so that as it penetrates the fuse, its effective cross-section area remains the same, providing a constant or only slightly increasing resistance to movement of the punch. By this means the desired pressure may be correlated to amount of punch movement so that release occurs at a predetermined pressure. This permits the loading to be distributed substantially equally between a plurality of release devices.

As best seen in FIG. 13, the honeycomb element 142 is preferably provided with cover sheets 143, a portion of the sheet being shown as removed to expose the interior honeycomb structure.

A comparison of FIGS. 2 and 3, 4 or 5 illustrates an important feature of the invention which is referred to herein as a "self-seeking" function. It will be observed that locking levers 42 and 44 have a similarly shaped rearwardly facing abutment constituted by a rounded portion on the laterally extending arm 52. In FIG. 2 it will be observed that these two abutments are locked substantially in alignment with the pivot pin 56, thus causing the abutment surfaces to define a detent structure of maximum width. Referring to FIG. 3 for example, it will be noted that the abutment 38 and the corresponding abutment on the arm 52 are moved closer together by virtue of the fact that the pivot pin 56 has moved out of its position in alignment therebetween.

For simplicity the present disclosure has referred to pallet locking structure and has identified the recess 24 as provided in a pallet. It will of course be understood that this pallet need not be a separate support structure but may in fact constitute the floor of an open-top container or a completely enclosed load housing structure.

What is claimed is:

1. A pallet locking structure for a pallet movable in opposite directions into and out of loaded and locked position and having an abutment surface generally perpendicular to said directions, said locking structure comprising a movable locking device having a pallet abutment,
means supporting said abutment for movement between a locking position in which said abutment is engageable with the abutment surface of a pallet in locked position and an unlocked position in which said abutment is out of the path of movement of the abutment surface,
said locking device being constructed and arranged to cause pressure applied to said abutment by a pallet in a direction away from its locked position to tend to move said abutment to unlocked position,
and a lock retainer comprising a punch and a fuse plate connected to oppose movement of said abutment to unlocked position until forces applied to said punch as a result of pressure applied to said abutment by the pallet cause further movement of said punch by at least partial penetration of said fuse plate by said punch.

2. Pallet locking structure as defined in claim 1, in which the abutment surface on the pallet engaging the locking device abutment is a side surface of a recess in the side of the pallet.

3. Pallet locking structure as defined in claim 1, in which said fuse plate is a solid substantially incompressible material from which a slug is punched by complete penetration of said fuse plate by said punch.

4. Pallet locking structure as defined in claim 1, in which said fuse plate is a compressible material.

5. Pallet locking structure as defined in claim 1, in which said fuse plate is a collapsible material.

6. Pallet locking structure as defined in claim 3, in which said locking device comprises a pivoted element having said abutment at one end and its pivot axis at the other end and located such that initial movement of said element by the pallet is in a direction making an acute angle with the direction of movement of the pallet away from locked position.

7. Pallet locking structure as defined in claim 3, in which said punch and fuse plate comprises a tubular housing having an apertured transverse web intermediate its ends, said punch being slidable in one end of said housing and having a reduced punch portion movable through the aperture in said web, a removable tubular member in the other end of said housing having an opening in its inner end dimensioned to slidably receive the end of said punch portion and having a flat annular end to engage the fuse plate and to support the fuse plate against said web to be pierced by said punch portion when piercing force is applied thereto.

8. Pallet locking structure as defined in claim 7, said housing having a radial slot through which a flat fuse plate may be inserted and through which the punched plate may be removed.

9. Pallet locking structure as defined in claim 7, in which said opening in said tubular member extends to the outer end of said member to provide for removal of the slug punched from the fuse plate.

10. Pallet locking structure as defined in claim 8, in which said opening in said tubular member extends to the outer end of said member to provide for removal of the slug punched from the fuse plate.

11. Pallet locking structure as defined in claim 1, in which said locking device comprises a pair of links pivoted together adjacent first ends thereof, fixed pivot means mounting the other end of one of said links, a punch abutment at the other end of said other link, said pallet abutment being provided on one of said links adjacent the pivot connection therebetween in position to be engaged by the abutment surface on the pallet when the links are inclined with respect to each other and operable upon movement of the pallet from locked position to bring the fixed pivot means, the pivot connection between said links, and said punch abutment into alignment to displace said punch abutment to actuate said punch.

12. Pallet locking structure as defined in claim 11, in which said links are dimensioned to have a locking position in which the axis of the pivot means pivoting said links together is located laterally from opposite ends of said links, and said links are movable to a release position in which said pivot axis moves into substantial alignment with opposite ends of said links.

13. Pallet locking structure as defined in claim 1, in which said locking device is located in a fixed position at one side of a pallet when the pallet is in locked condition against movement parallel to the said one side of the pallet, said locking device comprising an elongated compartment having an inner wall adjacent the said one side of the locked pallet, said wall being apertured for movement therethrough of said pallet abutment, said device comprising a first L-shaped link having a free end and a laterally extending arm at its other end, said pallet abutment being at the free end of said arm, said first link being pivoted at its end remote from said arm within said compartment for movement between a locked position in which said arm and the pallet abutment of said link extend through said opening for engagement of said pallet abutment by the abutment surface on a pallet in locked position, and an unlocked position in which said arm and pallet abutment are retracted through said opening into said compartment to release the pallet.

14. Pallet locking structure as defined in claim 13, which comprises a second L-shaped link having a free end remote from said first link movable longitudinally of said compartment, said second link having at its other end a laterally extending arm pivoted at its free end to the free end of the laterally extending arm of said first link, the free end of said second link being movable longitudinally of said compartment as said arms are forced through said opening into said compartment to bring the pivot connection between the free ends of said arms into substantial alignment with the ends of said links remote from the arms of said links.

15. Pallet locking structure as defined in claim 1, comprising pivot support means for said locking structure having an axis parallel to the direction of pallet movement providing for pivot movement of said locking structure between an elevated operating position at the side of a pallet to be locked, and an inoperative lowered position in which said entire locking structure is below the pallet.

16. A pallet locking structure for a pallet movable in opposite directions into and out of loaded and locked position and having an abutment surface transverse to said directions, said locking structure comprising
a movable locking device having a pallet abutment,
means supporting said abutment for movement between a locking position in which said abutment is engageable with the abutment surface of a pallet in locked position and an unlocked position in which said abutment is out of the path of movement of the abutment surface,
said locking device being constructed and arranged to cause pressure applied to said abutment by a pallet away from its locked position to tend to move said abutment to unlocked position,
resilient means urging said pallet abutment to unlocked position,
pressure release means movable between operating and idle positions,
means on said pressure release means engageable with said locking device when said pressure release means is in operating position operable to prevent movement of said abutment to unlocked position until attainment of a predetermined pressure between a locked pallet and said device.

17. Pallet locking structure as defined in claim 16, comprising resilient means urging said pressure release means toward operating position,
means acting between said locking device and said release means to maintain said abutment in locked position in the absence of pallet applied pressure thereto.

18. Pallet locking structure as defined in claim 17, comprising manually operated means for moving said pressure release means to idle position to release said locking device.

19. Pallet locking structure as defined in claim 16, comprising manually releasable latch means engageable with said locking device upon movement of said abutment to unlocked position to maintain said abutment in unlocked position until said latch means is released.

20. Pallet locking structure for a pallet movable in opposite directions into and out of loaded and locked positions and having an abutment surface transverse to said directions, said locking structure comprising
a movable locking device having a pallet abutment,
means supporting said abutment for movement between a locking position in which said abutment is engageable with the abutment surface of a pallet in locked position and an unlocked position in which said abutment is out of the path of movement of the abutment surface,
said locking device being constructed and arranged to cause pressure applied to said abutment by a pallet as a result of forces applied to the pallet tending to move the pallet away from its locked position to tend to move said abutment to unlocked position, resilient means urging said pallet abutment to unlocked position, pressure release means movable between operating and idle positions, means on said pressure release means engageable with said locking device when said pressure release means is in operating position operable to prevent movement of said abutment to unlocked position until attainment of a predetermined pressure between a locked pallet and said device;

in which said pressure release means comprises a punch and a fuse plate connected to prevent movement of said abutment to unlocked position until forces applied to said punch as a result of pressure applied to said abutment by said pallet cause at lease partial penetration of said plate by said punch.

21. Cargo retainer structure for a pallet having a locking recess therein including a transversely extending abutment surface, comprising an elongated area over which cargo pallets are movable longitudinally in loading and unloading, an elongated chamber beneath a longitudinally extending lateral edge of said area, elongated guide and retainer rail means pivotally mounted within said chamber and movable between an upwardly extending operating position and an inoperative position in which said means is housed within said chamber, said means comprising an elongated rail having a fixed retainer flange at its upper edge in operating position adapted to overlie a side edge of an adjacent pallet, said rail having a guiding and retaining surface engageable with the side edge of a pallet, and a locking device carried by said rail and movable into and out of said recess, said locking device comprising a pallet abutment movable inwardly relative to a pallet into engagement with the abutment surface in the locking recess of the pallet to prevent movement of the pallet longitudinally of said area in unloading direction while engaged by said abutment, and pressure responsive means operatively connected to said abutment to retain said abutment in pallet locking position and to release said abutment upon attainment of a predetermined pressure between the pallet and said abutment.

22. Cargo retainer structure as defined in claim 21, in which said rail has an elongated compartment therein, and in which said locking device is substantially housed within said compartment in said rail.

23. Cargo retainer structure for a pallet having a locking recess therein including a transversely extending abutment surface, comprising an elongated area over which cargo pallets are movable longitudinally in loading and unloading, an elongated chamber beneath a longitudinally extending lateral edge of said area, elongated guide and retainer rail means pivotally mounted within said chamber and movable between an upwardly extending operating position and an inoperative position in which said means is housed within said chamber, said means comprising an elongated rail having a fixed retainer flange at its upper edge in operating position adapted to overlie a side edge of an adjacent pallet, said rail having a guiding and retaining surface engageable with the side edge of a pallet, and a locking device carried by said rail and movable into and out of said recess, said locking device comprising a pallet abutment movable inwardly relative to a pallet into engagement with the abutment surface in the locking recess of the pallet to prevent movement of the pallet longitudinally of said area in unloading direction while engaged by said abutment, and pressure responsive means operatively connected to said abutment to retain said abutment in pallet locking position and to release said abutment upon attainment of a predetermined pressure between the pallet and said abutment, in which said rail has an elongated compartment therein, and in which said locking device is substantially housed within said compartment in said rail, a control rod movable longitudinally in said chamber beneath an edge of said area, said pressure responsive means having an operating and an inoperative position, and means connected to said pressure responsive means engageable with said control rod when said rail is raised to operating position to move said pressure responsive means to inoperative position to release said pallet abutment to free a pallet retained thereby in locked position.

24. Cargo retainer structure for a pallet having a locking recess therein including a transversely extending abutment surface, comprising an elongated area over which cargo pallets are movable longitudinally in loading and unloading, an elongated chamber beneath a longitudinally extending lateral edge of said area, elongated guide and retainer rail means pivotally mounted within said chamber and movable between an upwardly extending operating position and an inoperative position in which said means is housed within said chamber, said means comprising an elongated rail having a fixed retainer flange at its upper edge in operating position adapted to overlie a side edge of an adjacent pallet, said rail having a guiding and retaining surface engageable with the side edge of a pallet, and a locking device carried by said rail and movable into and out of said recess, said locing device comprising a pallet abutment movable inwardly relative to a pallet into engagement with the abutment surface in the locking recess of the pallet to prevent movement of the pallet longitudinally of said area in unloading direction while engaged by said abutment, and pressure responsive means operatively connected to said abutment to retain said abutment in pallet locking position and to release said abutment upon attainment of a predetermined pressure between the pallet and said abutment, in which said rail has an elongated compartment therein, and in which said locking device is substantially housed within said compartment in said rail, in which the compartment in said rail has an inner wall constituting a guide and lateral retainer surface for a pallet, said wall having an opening therethrough, said locking device including a pivoted link having a laterally extending arm having said abutment at its free end movable through said opening, the pivot axis of said link being located such that pressure applied to said abutment by the adjacent pallet tends to swing said link to withdraw said abutment.

25. Cargo retainer structure as defined in claim 24, in which said pressure responsive means comprises a punch and fuse plate.

26. A pressure responsive cartridge comprising an elongated generally tubular housing, a flat fuse plate, means for supporting said flat fuse plate in said housing including an anvil comprising an apertured plate support surface at its inner end engageable by one side of the fuse plate, and a punch slideable in said housing and projecting beyond one end of said housing and having a punch portion having a cross-section shape dimensioned to have a close fit within the aperture in said plate support surface positioned to penetrate said plate and to project a punched slug through the aperture in said plate support surface, said anvil being movable into the other end of said housing to engage the adjacent side of said fuse plate.

27. A cartridge as defined in claim 26, in which said housing has an inner cylindrical guide surface at one end terminating in a transverse web having an opening therethrough, said punch having a cylindrical guide portion slidable in the guide surface and having a reduced punch portion slidably supported in the web opening, said anvil constituting a generally tubular clamp and anvil member removably received in the other end of said housing and adapted to clamp said flat fuse plate against said web, said member having an opening in alignment with the opening in said web dimensioned to receive the plug punched from said fuse plate by said punch.

28. A cartridge as defined in claim 27, said housing having a transverse radially extending slot at the side of said web remote from said punch, the replaceable fuse plate being insertable through said slot to be clamped between said web and said member.

29. A cartridge as defined in claim 28, said fuse plate having a laterally extending flange at its outer end for removal of the punched plate after a punching operation.

30. A pallet locking structure for a pallet movable longitudinally in an aircraft rearwardly toward and through a rear opening in said aircraft from a locked position within the aircraft under the influence of parachute means deployed behind the aircraft in flight, locking means engageable with said pallet to retain said pallet in locked position until the force applied by said parachute means attains a predetermined value, pressure responsive release means operably connected to said locking means and responsive to the force exerted by said parachute means to release said locking means upon attainment of such predetermined force by said parachute means, said release means comprising a fuse plate, a punch, and means for applying between said punch and plate a force proportional to the force applied by said parachute means in a direction to cause said punch to penetrate said fuse plate upon attainment of a force applied to the pallet by said parachute means predetermined by the material and thickness of said fuse plate and the cross-sectional area of said punch.

31. Structure as defined in claim 30, which comprises a guide plate having an opening therethrough dimensioned to slidably receive said punch, an anvil having an opening also dimensioned to slidably receive said punch, said anvil having its opening aligned with the opening in said guide plate, and being spaced from said guide plate to receive replaceable fuse plates therebetween.

32. Structure as defined in claim 31, in which said anvil is movable to clamp said fuse plate between said anvil and said guide plate for engagement by said punch.

33. A load locking structure comprising a detent support located within an aircraft adjacent the path of movement of a longitudinally movable load support having a recess having an abutment surface transverse to the direction of its path of movement, movable detent means carried by said detent support, said detent means comprising a plurality of relatively movable elements having nose portions movable as a unit into and out of the recess in said load support, and means interconnecting said elements effective upon movement of said nose portions into the recess in said load support to effectively widen the detent means from a narrower configuration which provided a self-seeking action facilitating initial entry of said nose portions into said recess.

34. Load locking structure as defined in claim 33, in which said locking elements consist of a pair of elements having a pivot connection directly pivotally connecting said elements together, said elements having oppositely facing abutment surface portions, the pivot connection between said elements assuming a position directly between said abutment surface portions as said nose portions move to fully inserted position in the load support recess.

35. Constant value force responsive means comprising a movable member intended to be moved in a predetermined movement only when subjected to a force of a predetermined invariable value, an anvil having a surface having an opening therein of a predetermined cross-section, a punch shaped and dimensioned in conformity with said opening, a fuse plate of known material and thickness interposed between said punch and said anvil surface, means connecting said movable member and punch to apply to said punch a force proportional to the force applied to said movable member, a housing including a guide and support plate, said fuse plate being interposed between said guide and support plate and said anvil, said guide and support plate having an opening therethrough conforming in size and shape to the opening in the support surface of said anvil to guide and support said punch as it is caused to penetrate said fuse plate, in which said anvil is movable within said housing to clamp said fuse plate against the adjacent surface of said guide and support plate.

* * * * *